United States Patent [19]
LeVan

[11] Patent Number: 6,034,372
[45] Date of Patent: Mar. 7, 2000

[54] PUPIL STOP FOR MULTI-BAND FOCAL PLANE ARRAYS

[75] Inventor: Paul D. LeVan, Albuquerque, N.Mex.

[73] Assignee: The United States of America as represented by the Secretary of the Air Force, Washington, D.C.

[21] Appl. No.: 09/032,351
[22] Filed: Feb. 27, 1998

Related U.S. Application Data

[63] Continuation-in-part of application No. 08/984,309, Dec. 3, 1997.
[51] Int. Cl.$^7$ .......................................................... G01J 5/08
[52] U.S. Cl. ........................ 250/352; 250/338.1; 359/350; 359/589
[58] Field of Search .............................. 250/352, 370.08, 250/338.1, 339.01; 359/350, 589, 359; 283/88

[56] References Cited

U.S. PATENT DOCUMENTS 4,683,496  7/1987  Tom ........................................ 348/625
5,751,473  5/1998  Runciman ................................ 359/356

OTHER PUBLICATIONS

Reine, M. B. et al, "Independently-accessed Back-to-Back HgCdTe Photodiodes: A New Dual-band Infrared Detector," Proc. 1993 Workshop on the Physics and Chemistry of Mercury Cadmium Telluride and Other IR Materials, Seattle, Washington, Oct. 19–21, 1993. Reference supplied with original filing 08/984309 FD Dec. 3, 1997.

Primary Examiner—Constantine Hannaher
Assistant Examiner—Albert Gagliardi
Attorney, Agent, or Firm—Kenneth E. Callahan

[57] ABSTRACT

A multi-band pupil stop is disclosed for use in multi-band focal plane array imaging systems. The object is to provide similar point spread functions at the focal plane array. The pupil stop is comprised of one or more nested annuli. Each annulus is a pass-band filter with the outermost annulus passing the longest wavelength waveband and each successive inner annulus passing a successively shorter wavelength waveband. The pass-band of each annulus is such that the ratio of the center wavelength of each pass-band to the outer diameter of each annulus is approximately equal.

2 Claims, 2 Drawing Sheets

PUPIL STOP FOR MULTI-BAND FOCAL PLANE ARRAYS

This is a continuation in part application of pending application Ser. No. 08/984,309 filed on Dec. 3, 1997.

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

1. Field of the Invention

The invention relates generally to imaging systems and in particular to imaging scenes onto two-dimensional focal plane arrays in two or more wavebands.

2. Description of the Prior Art

A new generation of focal plane array technologies permit imaging in two or more wavebands using a single focal plane array. In the infrared portion of the spectrum, the wavebands are typically in the medium wavelength infrared (MWIR) band at 3–5 $\mu$m and in the LWIR band of 8–12 $\mu$m. (See for example Reine et al., *Independently Accessed Back-to-Back HgCdTe Photodiodes: A New Dual-Band IR Detector*, Journal of Electronic Materials, Vol. 24, No. 5, 1995.) These multi-band focal plane array systems enjoy a time-multiplex advantage over systems where selectable spectral filters are required to perform this function.

Infrared imaging typically requires a focal plane array (FPA) operating at cryogenic temperatures. To do this, the FPA is mounted in a Dewar or similarly cooled enclosure. The cryogenic environment also serves to eliminate extraneous thermal radiation originating from the optical system structural members located outside the cryogenic enclosure. Cold pupil stops are also commonly employed in long-wavelength infrared (LWIR) sensors to further reduce extraneous emissions of LWIR background radiation, i.e., all radiation other than that collected by the sensor aperture and within the focal plane array's field of view. The location of the pupil stop, as is known in the art, depends on the precise optical prescription and is generally located between a cold field stop and the FPA.

The point-spread function (PSF) of diffraction-limited optical systems widens with increasing wavelength. Consequently, for dual-band systems, the sensor point spread function tends to be over-sampled at the longer passband where the effects of diffraction are greater, and under-sampled in the shorter bandpass, by the pixels in the focal plane array. The same geometric centers obtain for the two wavebands for all current dual-band FPAs. For dual-band IR sensors systems, for example, the PSF results in two different resolutions for an ordinary cold pupil stop and fewer pixel samples for the PSF for the MWIR band than for the LWIR band.

BRIEF SUMMARY OF THE INVENTION

The object of the present invention is to provide similar point spread functions in multi-band imaging systems. For a dual-band IR imaging system, a cryogenic pupil stop is employed having a long-pass IR filter in the shape of an annulus of infrared spectral filter material. The inside edge of the annulus forms the shorter waveband (MWIR) pupil stop. The outer diameter of the annulus forms the pupil stop for the longer waveband. The inner and outer diameters of the annulus are such that the ratio $\lambda/D$ for each waveband are approximately the same. The pupil stop is located within the cryogenic volume of the IR sensor at a relayed pupil position. The resulting cryogenic pupil stop produces similar diffraction-limited image resolutions. Multi-band pupil stops would use two or more nested annuli to match the point spread functions in three or more wavebands. Multi-waveband focal plane arrays sensitive to the IR, visible, or ultraviolet spectrum can use the multi-band pupil stop to provide similar point spread functions.

DETAILED DESCRIPTION OF THE INVENTION

An exit pupil stop is commonly used in IR optical systems to reject extraneous background radiation. The theoretical resolution of the optical system is a function of the wavelength ($\lambda$) and the diameter of the telescope entrance aperture as determined by the pupil stop (D). The image of a diffraction-limited point source for a telescope of diameter D is a disk of radius R (radians, in object space) that is proportional to the ratio $\lambda/D$. For a fixed diameter pupil stop, the image disk of a point source increases with increasing wavelength. Resolution, the ability to distinguish between two point sources, is inversely proportional to the radius R, or resolution is proportional to $D/\lambda$. A dual-band optical system with a fixed pupil stop of diameter D would, therefore, yield two different resolutions for the two different wavebands.

The preferred embodiment of the present invention yields similar resolutions for a multi-band diffraction-limited optical system by the use of a unique pupil stop. The normal pupil stop for this system would be a metallic sheet with a circular hole. For simplicity, a dual-band pupil stop will be described in detail; the same principle applies to a multi-band pupil stop with two or more nested annuli.

Figure 1:
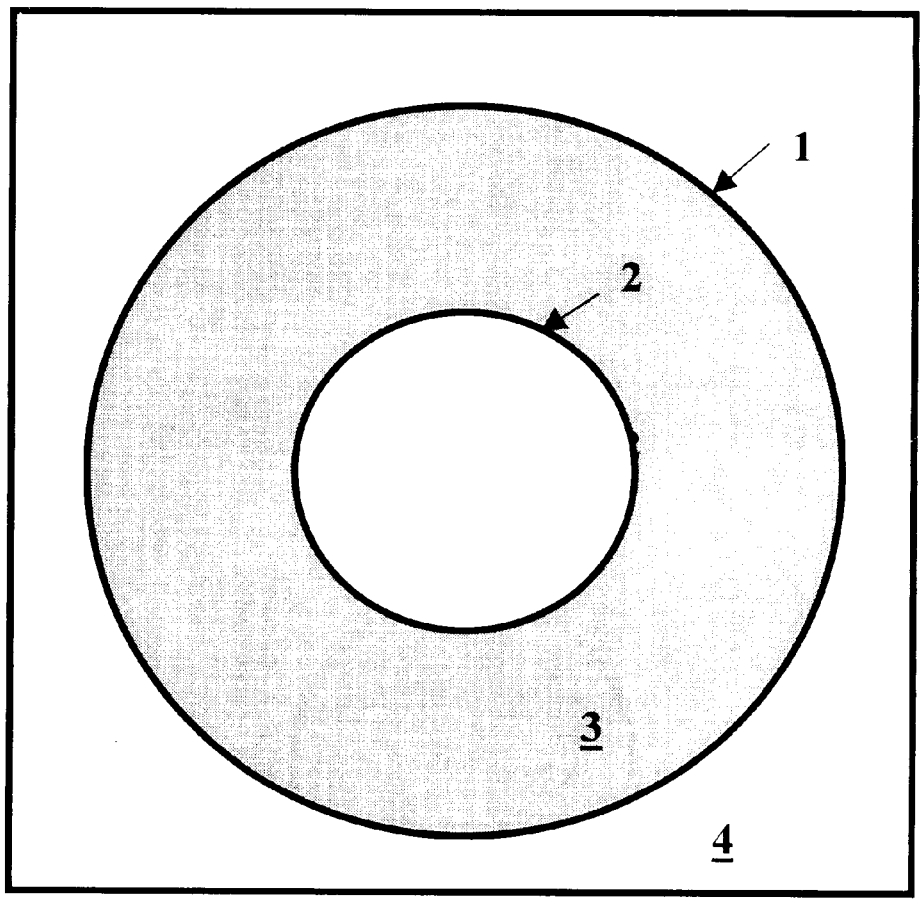
FIG. 1 is a representation of a dual-band pupil stop.

A dual-band pupil stop of the present invention is comprised of an annulus of spectral filter material that transmits in the longer wavelength waveband and blocks in the shorter wavelength waveband. This annulus fits within the normal pupil stop located at the pupil image of the optical system. The concept is shown in FIG. 1 wherein the diameter D1 of the outer edge 1 of the annulus 3 defines the pupil diameter for the long waveband. The inner edge of the annulus 2 defines the pupil diameter D2 for the shorter waveband $\lambda 2$. The annulus is attached to a conventional metallic pupil stop 4 with its aperture corresponding to the outer edge 1 of the annulus. The annulus 3 passes the long waveband but is opaque to the short waveband. The outer diameter D1 and inner diameter D2 are such that the ratio $\lambda/D$ is approximately the same for both wavebands (i.e., $\lambda 1/D1 \approx \lambda 2/D2$). For example, if the outer diameter D1 for the LWIR waveband is 1 inch, the inner diameter D2 can readily be found to be 0.4 inches, assuming the center wavelength for the MWIR band to be $\lambda 2 = 4$ $\mu$m and for the LWIR to be $\lambda 1 = 10$ $\mu$m.

Figure 2:
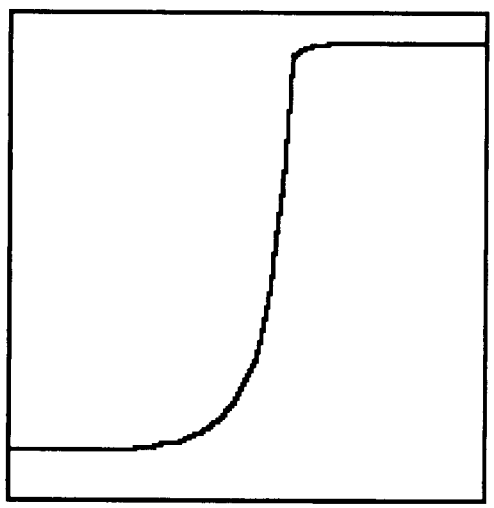
FIG. 2 shows the transmission properties of the interference filter comprising the pupil stop.

The transmission properties of the long-pass filter annulus 3 T($\lambda$) vs. wavelength are shown in FIG. 2. The transmission curve shows that the annular region does not transmit in the shorter wavelength band (typically, the MWIR); the diameter of the pupil stop in this wavelength region is therefore the inner diameter. The filter material does transmit at longer wavelengths, and the effective pupil stop diameter is that of the outer diameter 1 (or, in practice, of a true metallic stop used in conjunction with the dual-band pupil stop).

For a dual-band IR imaging system, the pupil stop is located within the cryogenic container housing the focal plane array. A traditional metallic "cold stop" is located at the outer edge of the annulus and is the pupil stop for the longer wavelength infrared since the annulus passes the LWIR band. However, since the spectral filter material acts as a blocking filter for the shorter wavelength passband, the inner edge of the annulus forms the cold pupil stop for this spectral bandpass. With the pupil diameters set in proportion to the wavelengths of the two wavebands, similar amounts of image blurring due to diffraction are maintained for these two wavebands. By proper sizing of the inner and outer radii of the annulus, nearly identical diffraction-limited point spread functions can be obtained for two wavebands at the focal plane array, on which the intermediate field focus is re-imaged. The invention results in similar amounts of sampling of the sensor point spread functions in the two wavebands imaged simultaneously by dual-band focal plane arrays.

The fabrication of infrared spectral filters by deposition of thin dielectric films on a transmissive substrate is well known in the art. The filters are typically one-inch diameter disks with thickness varying from approximately 0.03 to 0.06 inches. One embodiment of the invention proposed here would use such filter material that is non-transmissive in a shorter wavelength infrared band, but fully transmissive in a longer wavelength waveband. A hole can be produced through the center of the filter disk of the proper diameter to produce the annulus for the dual-band cryogenic pupil stop.

In the preferred embodiment, non-dielectric filter coatings with the desired transmissive properties are deposited onto a substrate in the shape of an annulus. For applications utilizing wavebands in the MWIR through LWIR, conventional epitaxial growth technology, both liquid phase and vapor phase epitaxy is capable of producing optical quality films. Films of $Hg_{1-x}Cd_xTe$, for example, could serve as the long-pass filter material, the x-value chosen to yield the desired long-pass transmission wavelength. Suitable transparent substrates for growth of such films include wafers of CdTe or CdZnTe, and composite substrates such as CdTe or CdZnTe films deposited onto a silicon wafer. These substrates are all commercially available. The annulus can then be very accurately defined and fabricated using conventional masking, photolithography, and etch technology. For near-IR/short IR wavebands, Ge on GaAs is an excellent annulus filter material. Materials for visible and ultraviolet wavebands are also readily available.

Figure 3:
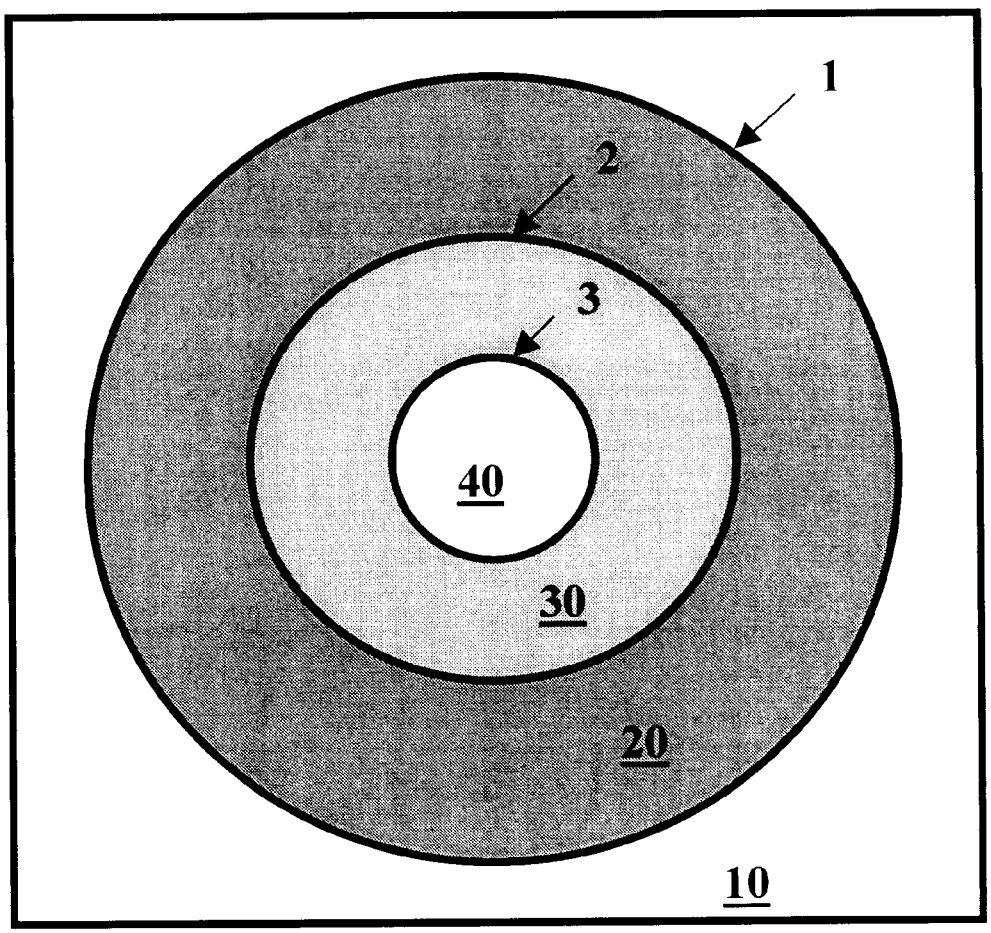
FIG. 3 is a representation of a three-waveband pupil stop.

Multi-band pupil stops employ two or more nested annuli. FIG. 3 is an example of a three-waveband pupil stop. Two nested annuli, the outer 20 and the inner 30, have outer edge diameters 1, 2 of D1 and D2, respectively. The center disk 40 has an outer edge diameter 3 of D3 that defines the shortest waveband ($\lambda 3$) pupil stop. The outer diameter D2 of the inner annulus 30 defines the pupil stop for an intermediate waveband ($\lambda 2$). The outer diameter D1 of the outer annulus 20 defines the pupil stop for the longest waveband ($\lambda 1$). The outer annulus 20 is attached to a conventional metallic pupil stop 10. $\lambda 1$, $\lambda 2$, and $\lambda 3$ are the center wavelengths for their respective wavebands. The relationship between the diameters and the center wavelengths is given by $\lambda 1/D1 \cong \lambda 2/D2 \cong \lambda 3/D3$. For $\lambda 1=10$ $\mu$m, $\lambda 2=4\mu$m, $\lambda 3=1$ $\mu$, and D1=1 inch, this gives D2=0.4 inch and D3=0.1 inch.

The profile of the inner edge of the annulus has critical implications in controlling the level of scattering of radiation in the sensor. For example, typical metallic optical "stops" have a sharp edge profile to reduce the amount of scattering of infrared radiation to the lowest possible levels. Masking, photolithography, and etch technologies produce extremely sharp edge profiles, minimizing the amount of scattering.

For military applications the wavebands of interest are MWIR and LWIR. MWIR is used for detecting plume signatures from missiles. In this instance, the decreased optical collecting area resulting from the undersized MWIR pupil stop is of little consequence since missile plumes are very bright. LWIR is advantageous for hard body surveillance, acquisition, and tracking. Remote sensing applications could also benefit from the proposed invention.

The annular pupil stop of the present invention would also be appropriate for dual-band sensors in the visible or ultraviolet ranges without the use of cryogenic cooling. An example of this is in advanced capability star trackers, a sensor subsystem present on most commercial and military satellites. Conventional star trackers use focal plane arrays sensitive to a single waveband in the visible spectrum. These are typically single waveband arrays based on charge coupled device (CCD) technology. CCDs are now available that respond to two visible wavebands separately. The present invention could be implemented with such dual waveband, visible CCD arrays to match the point spread functions in the two wavebands. This would facilitate centroiding in the two wavebands simultaneously and would afford faster and more accurate star tracking. In addition, dual waveband data would enable faster star categorization leading to more rapid star identification.

It will be apparent that many modifications and variations may be implemented without departing from the scope of the novel concept of this invention. Therefore, it is intended by the appended claims to cover all such modifications and variations which fall within the true spirit and scope of the invention.

What is claimed is:

1. In a multi-band focal plane array imaging system, a multi-band pupil stop comprising:

a) one or more nested annuli, each annulus having an inner and an outer diameter, the inner diameter being the outer diameter of the next smaller nested annulus;

b) each annulus being a pass-band filter with the outermost annulus passing the longest wavelength waveband and each successive inner annuli passing a successively shorter wavelength waveband;

c) and the pass-band of each annulus being such that the ratio of the center wavelength of each pass-band to the outer diameter of each annulus being approximately equal.

2. In a dual-band infrared detection system that includes an infrared sensitive detector element and a cold shield enclosure within which the detector element is mounted and into which the infrared radiation may enter through a cold shield aperture aligned with an image surface on said detector element and with said dual-band infrared radiation having a first longer waveband centered at $\lambda 1$ and a second shorter waveband centered at $\lambda 2$, a cryogenic pupil stop yielding similar point spread functions for both wavebands, comprising:

a) a long-pass infrared filter in the shape of an annulus having an inner diameter D2 and an outer diameter D1 and located at the pupil stop position within the cold shield enclosure;

b) said long-pass infrared filter capable of transmitting said longer waveband but opaque to said shorter waveband; and c) the inner and outer diameters of said annulus being related such that $\lambda 1/D1$ is approximately equal to $\lambda 2/D2$, whereby said dual-band infrared radiation yields similar point spread functions for each waveband at said image surface of the detector element.

* * * * *